United States Patent [19]

Yang et al.

[11] Patent Number: 5,851,667

[45] Date of Patent: Dec. 22, 1998

[54] PROCESS FOR PRODUCTION OF A COMPOSITE PRODUCT

[75] Inventors: Yeong-Show Yang, Witney, Great Britain; Francette Porato, Le Mesnil en Thelle; Serge Lequeux, Verneuil en Halatte, both of France

[73] Assignee: Cray Valley S.A., France

[21] Appl. No.: 598,170

[22] Filed: Feb. 7, 1996

[30] Foreign Application Priority Data

Feb. 7, 1995 [FR] France ................................. 95 01485

[51] Int. Cl.$^6$ ........................................... D02G 3/00
[52] U.S. Cl. ..................... 428/396; 264/240; 264/260; 264/263; 428/423.1; 428/423.3; 428/425.8
[58] Field of Search .................... 428/396, 423.1, 428/423.3, 423.5, 424.8, 425.9; 264/240, 260, 263

[56] References Cited

U.S. PATENT DOCUMENTS

| | | | |
|---|---|---|---|
| 4,107,101 | 8/1978 | Kubens | 521/137 |
| 4,172,060 | 10/1979 | Dalibor et al. | |
| 4,233,396 | 11/1980 | Armstrong et al. | 430/320 |
| 4,532,097 | 7/1985 | Daniels et al. | 264/258 |
| 4,773,952 | 9/1988 | Wesley, Jr. | 156/191 |
| 4,801,495 | 1/1989 | Van Der Hoeven | 428/286 |
| 4,880,872 | 11/1989 | Thomas | 525/28 |
| 5,088,735 | 2/1992 | Shigetoh | 428/257 |
| 5,159,044 | 10/1992 | Bogner | |

FOREIGN PATENT DOCUMENTS

| | | |
|---|---|---|
| 007 778 | 7/1979 | European Pat. Off. |
| 391 668 | 4/1990 | European Pat. Off. |
| 1162724 | 8/1969 | United Kingdom |

OTHER PUBLICATIONS

Derwent Abstract of JP 5117347.
Japio Abstract of JP 5117347.
Derwent Abstract of JP 57 078 424 (May 1982).
Derwent Abstract of JP 5,001,157 (Jan. 1993.
Derwent Abstract of JP 2,218,196. (Aug. 1990).

Primary Examiner—Melvyn I. Marquis
Assistant Examiner—D. Aylward
Attorney, Agent, or Firm—Millen, White, Zelano, & Branigan, P.C.

[57] ABSTRACT

The invention relates to a process for production of a composite product which involves molding several materials of different natures, including an oriented-reinforcement material that is preimpregnated with resin, without the resin being injected separately after the other materials in the mold are assembled, in which the resin is a modified polyester-polyurethane that is formed by reacting:
 a first component that comprises (A) at least one polyisocyanate
with a second component that comprises:
 (a) at least one polyol polyester,
 (b) at least one ethylenically unsaturated monomer.

20 Claims, No Drawings

PROCESS FOR PRODUCTION OF A COMPOSITE PRODUCT

BACKGROUND OF THE INVENTION

This application is related to copending application Ser. No. 08/598,171, pending, which is incorporated by reference in its entirety herein.

This invention relates to a process for production of a composite product that comprises a preimpregnated material with directed reinforcement that is suitable for shaping.

Prepregs made of unsaturated polyester resin in the form of relatively rigid sheets with a thickness of up to about 1 cm, particularly for the production of large-dimension parts with good mechanical resistance, are already known. They are obtained by impregnating long glass fibers (i.e., of a length at least equal to about 25 mm) by a paste of low viscosity that comprises unsaturated polyester resin, a free-radical catalyst, a shrinkage-compensating agent, a curing agent (such as magnesia), a demolding agent, an ethylenically unsaturated monomer, a mineral filler, and, if necessary, a pigment paste, then by allowing the viscosity to increase during a so-called curing phase.

Furthermore, various polyester-polyurethane hybrid resins are known, particularly from U.S. Pat. No. 4,107,101; U.S. Pat. No. 4,280,979; U.S. Pat. No. 4,880,872; FR-A-2 667 602 and WO94/00503.

For the needs of various applications in the areas of leisure activities; shipbuilding, aviation, and automotive design; and the electrical and electronics industries (particularly for printed circuits), attempts are now being made to find oriented-reinforcement prepregs that simultaneously have a set of favorable properties such as:

good wetting of the oriented reinforcement (such as glass, carbon or organic fiber, cloth or mat) by the synthetic resin, manipulability of the prepreg (i.e., sufficient rigidity and absence of sticking) after as short a time as possible, stability of the prepreg (i.e., moldability), after storage at a temperature of about −18° C. to 30° C., for as long a period as possible, as low a molding temperature and as short a molding time as possible, good adhesion of the prepreg to materials as varied as metals (in particular copper, steel and aluminum), thermoplastic polymers (such as particularly polyethylene, polypropylene, polyamides), and polyurethanes (in the form of, e.g., foam), mechanical properties (particularly tensile strength, flexural strength, compression strength and impact resistance, elastic limit) that are as high as possible both at room temperature (up to about 40° C.) and under cold conditions (to about −40° C.)

As far as the synthetic resin that impregnates the oriented reinforcement is concerned, these different requirements are expressed by the need for a pot service life ("pot life") at room temperature (23° C.), or stability before use, of at least about 30 minutes and preferably at least about 45 minutes to carry out the impregnation of the oriented reinforcement.

In addition, in the fabrication of certain high-performance products that are intended for areas of leisure activities; of shipbuilding, aviation, and automotive design; and of the electrical and electronics industries, whereby the high performance levels of these products are attained by juxtaposing several (at times up to 5) materials of different types, including an oriented-reinforcement material that is preimpregnated with resin, a process of production that consists in assembling the various materials - with the exception of the resin—in a mold, then injecting the resin into the mold while molding the product by raising the temperature of the mold until the resin hardens enough to connect the oriented reinforcements and to ensure the adhesion of the oriented-reinforcement material to the other constituent materials of the product are known. This process makes it possible to guarantee the high performance levels of the products thus obtained, particularly high mechanical properties at room temperature and under cold conditions. It has the drawback, however, of requiring a relatively long molding time, for example, on the order of 20 minutes around 100° C. (case of the electronics industry) or else a cycle of several hours for increasing the molding temperature from 120° to 180° C. (case of the automotive industry). This drawback interferes with the productivity of the manufacture of these products and consequently accounts for their high costs. For the needs of high-performance products intended for the areas of leisure activities; shipbuilding, aviation, and automotive design; and the electrical and electronics industries, whereby the high performance levels of these products are attained by juxtaposing several (at times up to 5) materials of different natures, including a preimpregnated oriented-reinforcement resin material, researchers are therefore searching for a production process that makes it possible to maintain the high performance levels while significantly shortening the molding times of the materials. The possibility of attaining this object of the process depends quite obviously on the number and the nature of the constituent materials of these products, but primarily on the ability to find a resin that provides all of the properties listed above and is able particularly to harden (crosslink) during a molding process in a very short period of time.

SUMMARY OF THE INVENTION

An object of this invention is to meet the needs expressed above in the area of oriented-reinforcement prepregs and in the production of high-performance composite products.

The invention therefore has as an object a process for the production of a composite product that involves juxtaposing several materials of different natures, including an oriented-reinforcement material that is preimpregnated with resin, and a stage for molding at high temperature for long enough that the resin that is hardened by the temperature elevation connects the oriented reinforcements and ensures the adhesion of the oriented-reinforcement material to other constituent materials of the composite product. In this process, all the constituent materials, including the resin, are assembled simultaneously before the raising of temperature in the molding stage, i.e., without the resin being injected separately after the other materials are assembled in the mold. According to a preferred embodiment of the process according to the invention, the molding is carried out at a temperature of about 80° C. to 150°, and more preferably 80° C. to 120° C. and/or for a period of about 30 seconds to 6 minutes. The other materials combined with the oriented-reinforcement material that is preimpregnated with resin in the composite product can be selected particularly from metals (e.g., steel, copper, aluminum, etc.), thermoplastic polymers (e.g., polyethylene, polypropylene, polyamides), and polyurethanes.

To use the process according to the invention, it is possible to employ a resin that is able to preimpregnate an oriented-reinforcement material and to harden, preferably at a temperature of about 80° C. to 150° C. for a period of about 30 seconds to 6 minutes, in order to connect the oriented reinforcements and to ensure the adhesion of the oriented-reinforcement material to the other constituent materials of the composite product. To fulfill the condition of good wetting of the oriented reinforcement, the resin should preferably have a viscosity that does not exceed 10 d Pa·sec at the temperature selected for impregnation. This resin can be a modified polyester-polyurethane that is formed by reacting:

a first component that comprises (A) at least one polyisocyanate that has a functionality of 2 to 3, i.e., 2–3 NCO groups, and (B) a peroxide or a peroxide mixture that is able to initiate polymerization by free radicals at a ratio such that:

$$\frac{(B)}{(A)+(B)}$$

is about 0.5 to 4% by weight,
with a second component that comprises:
(a) at least one polyol polyester that is prepared from at least one diacid or ethylenically unsaturated anhydride and at least one polyhydric alcohol at an alcohol/acid molar ratio of between about 1.3 and 2.0,
(b) at least one ethylenically unsaturated monomer at a ratio such that $$\frac{(b)}{(a)+(b)}$$

is between 10% and 50% by weight,
(c) at least one promoter of the decomposition of the catalyst peroxide at room temperature (20° C.), at a level, based on the level of the second component of about 0 to 4% by weight,
(d) at least one catalyst of the isocyanate-alcohol reaction, at a level based on the second component, of about 0 to 4% by weight, and
(e) at least one hydroxylated (alk)acrylate at a ratio such that $$\frac{(e)}{(a)+(e)}$$

is between about 0.1% and 35% by weight,
with the ratio in moles of the NCO functions in the first component to the sum of the OH functions of components (a) and (e) of the second component being about 0.7 to 1.1.

The resin thus defined most often exhibits a vitreous transition temperature of about 100° to 160° C.

Optionally, the first component can comprise, in addition to polyisocyanate(s) (A) and peroxide(s) (B), at least one ethylenically unsaturated monomer that is identical to or different from the one that is present in the second component but preferably is miscible with the latter.

In this invention, ethylenically unsaturated monomer (b) is defined as a monomer that is able to copolymerize, under certain conditions, with polyol polyester (a) to produce a crosslinked structure. This monomer can be selected from styrene, substituted styrenes such as vinyl toluene, tert-butyl styrene, α-methylstyrene, chlorostyrene, dichlorostyrene, dibutyl fumarate and maleate, diethyl fumarate and maleate, dimethyl fumarate and maleate, N-vinylpyrrolidone, allyl methacrylate, allyl acetate, diallyl succinate, N-vinylcarbazole, lower alkyl esters ($C_1$ to $C_8$) of acrylic acid and methacrylic acid, cyclic acrylates and methacrylates, such as those of cyclohexyl and benzyl, bicyclic methacrylates and acrylates, such as those of isobornyl, diallyl phthalate, diallyl maleate, diallyl fumarate, triallyl cyanurate, acetate, vinyl crotonate and propionate, divinyl ether, conjugated dienes such as butadiene-1,3, isoprene, 1,3-pentadiene, 1,4-pentadiene, 1,4-hexadiene, 1,5-hexadiene, 1-9-decadiene, 5-methylene-2-norbornene, 5-vinyl-2-norbornene, 2-alkyl-2,5 -norbornene, 5-(5-hexenyl)-2-norbornene, 1,5-cyclooctadiene, bicyclo [2,2,2] octa-2,5-diene, cyclopentadiene, 4,7,8,9-tetrahydroindene and isopropylidene tetrahydroindene, and unsaturated nitriles such as acrylonitrile and methacrylonitrile as well as polyol (meth)acrylates such as the diacrylates and dimethacrylates of ethylene glycol, of propylene glycol, of 1,3-butanediol, of 1,4-butanediol, of 1,6-hexanediol, of neopentyl glycol, of 1,4-cyclohexanediol, of 1,4-cyclohexanedimethanol, of 2,2,4-trimethyl-1,3-pentanediol, of 2-ethyl-2-methyl-1,3-propanediol, of 2,2-diethyl-1,3-propanediol, of diethylene glycol, of dipropylene glycol, of triethylene glycol, of tripropylene glycol, of tetraethylene glycol, of tetrapropylene glycol, of trimethylolethane, of trimethylolpropane, of glycerol, of pentaerythritol; triacrylates and trimethacrylates of trimethylolethane, of trimethylolpropane, of glycerol and of pentaerythritol; pentaerythritol tetraacrylates and tetramethacrylates, dipentaerythritol di(meth)acrylates to hexa(meth)acrylates; monoethoxylated or polyethoxylated or monoproxylated or polyproxylated polyol poly(meth)acrylates such as the triacrylate and trimethacrylate of triethoxylated trimethylolpropane and tripropoxylated trimethylolpropane; tripropoxylated glycerol triacrylate and trimethacrylate; tetraethoxylated pentaerythritol triacrylate, trimethacrylate, tetraacrylate and tetramethacrylate, and their mixtures at all ratios.

Polyol polyesters (a) are well known and are prepared by reacting polycarboxylic acids or their anhydrides with polyhydrous alcohols. They are mainly linear and have a molecular weight of generally between about 400 and 4000. They can also have side chains when polyols or polycarboxylic acids that have more than two functional groups are used. It is generally preferred to prepare them from dicarboxylic acids with α,β-ethylenic unsaturation such as maleic, fumaric, citraconic, metaconic, itaconic, tetraconic or similar acids, or, when they exist, from corresponding anhydrides such as maleic anhydride.

It is also possible to prepare polyol polyesters (a) that are used in the resin by partially replacing these α,β-ethylene unsaturated dicarboxylic acids with (a) saturated polycarboxylic acid(s) such as the orthophthalic, isophthalic, terephthalic, succinic, methylsuccinic, adipic, sebacic, tetrabromophthalic, hexachloro-endomethylene tetrahydrophthalic, tetrachlorophthalic, glutaric, pimelic or similar acids, or, when they exist, the corresponding anhydrides. Preferably, the replacement can go up to about 45 mole %.

Among the polyhydrous alcohols that are used for the preparation of these polyol polyesters (a), generally saturated aliphatic diols, such as ethylene glycol, propylene glycol, butylene glycol, diethylene glycol, dipropylene glycol, triethylene glycol, tetraethylene glycol, butanediol, pentanediol, hexanediol, dibromoneopentyl glycol, 2-methyl-1,3 propanediol and neopentyl glycol are preferred. Bisphenol A and its alkoxylated derivatives, as well as other aromatic polyols, can also be used. To strike a satisfactory compromise between the reactivity of the system, the impact resistance of the resin, and its vitreous transition temperature, it is preferred to use a mixture of neopentyl glycol, propylene glycol and diethylene glycol.

The preparation of polyol polyester (a) can be carried out in the presence of an effective amount of at least one crosslinking inhibitor. As examples of crosslinking inhibitors that can be used, particularly phenothiazine, methylic ether of hydroquinone, N,N-diethyl-hydroxyamine, nitrobenzene, di-tert-butylcatechol, hydroquinone, p-anilinophenol, di-(2-ethylhexyl)-octylphenyl phosphite, 2,5-di-tert-butyl-4-hydroxy-toluene, methylene blue and their mixtures at all ratios can be cited. An effective amount of mixtures at all ratios can be cited. An effective amount of crosslinking inhibitor is generally between 0.01% and 0.2% by weight of polyol polyester (a).

Polyol polyesters (a) that can be used to prepare the resin have an alcohol index of between about 100 and 300 mg of KOH required to neutralize the acetic acid consumed by the acetylation of 1 g of sample, i.e., acetylation of the OH groups by acetic anhydride in a ethyl acetate solution int he presence of para-tolyl sulfonic acid as a catalyst, and an acid index that does not exceed about 10 and preferably does not exceed about 5 (milligrams of KOH required to neutralize 1 g of product). Their water content should not be more than 5000 ppm, preferably not more than about 2000 ppm, and still more particularly not more than 800 ppm.

Polyisocyanate (A) that is used in the resin has a functionality of at least 2 and at most 3. It can be aliphatic, cycloaliphatic and/or aromatic and selected from, in particular, 4,4'-diphenylmethane diisocyanate, 2,4- and 2,6-toluenediisocyanate, isophorone diisocyanate, tetramethylene diisocyanate, pentamethylene diisocyanate, 4,4'-dicyclohexylmethane diisocyanate, 2,2,4-trimethylhexamethylene-1,6-diisocyanate, triphenylmethane-4, 4,4''-triisocyanate, polymethylene (polyphenyl isocyanate), m-phenylene diisocyanate, p-phenylene diisocyanate, 1,5-naphthalene diisocyanate, naphthalene-1,4-diisocyanate, diphenylene-4,4'-diisocyanate, 3,3'-bi-tolylene-4,4'-diisocyanate, 1,4-cyclohexylene dimethylene diisocyanate, xylylene-1,4-diisocyanate, xylylene-1,3-diisocyanate, cyclohexyl-1,4-diisocyanate and 3,3'-dimethyldiphenyl-methane-4,4'-diisocyanate. It can also be used in the form of a prepolymer of the polyurea type or polyurethane of low molecular weight, i.e., by causing one of the polyisocyanates listed below to react with a polyamine or a polyol of low molecular weight. In the latter case, it is preferred to use an alkylene glycol, such as dipropylene glycol, tripropylene glycol, diethylene glycol, triethylene glycol, tetraethylene glycol, neopentyl glycol, 1,2- and 1,3-butylene glycols and trimethylolpropane. In this invention, polyisocyanate (A) can also be used in uretonimine form by heating one of the polyisocyanates indicated below to a high temperature in the presence of a catalyst that contains phosphorus to form a polycarbodiimide and then by causing the latter to react with another isocyanate group, for example as described in patent U.S. Pat. No. 4,014,935.

Peroxide or peroxide mixture (B) is preferably an organic peroxide such as benzoyl peroxide, 2,5-dimethyl-2,5-bis (2-ethylhexolperoxy) hexane or methylethylcetone peroxide, a peroxydicarbonate, a peroxyester such as tert-butyl peroxybenzoate, tert-butyl peroxyoctoate, tert-amyl peroxyoctoate or 2,5-diperoxyoctoate, or else 2,4-pentanedione peroxide. The ratio of peroxide or peroxide mixture (B) is preferably such that $$\frac{(B)}{(A)+(B)}$$

is about 1 to 2% by weight.

The preferred peroxide is benzoyl peroxide used alone or else in a mixture with a minority ratio of tert-butyl peroxy-2-ethylhexanoate.

As promoter (c), which is preferably used at a ratio of between 0.3% and 1.5% by weight, particularly solutions in an organic solvent such as dioctyl phthalate, mineral salts or organic salts of transition metals such as vanadium, chromium, manganese, iron, cobalt, nickel, copper, zinc, molybdenum and lead, or else tertiary amines such as dimethylaniline or N,N-dimethyl paratoluidine can be cited.

When peroxide (B) is benzoyl peroxide, a tertiary amine is preferably used as a promoter. When peroxide (B) is methylethylcetone peroxide, a salt such as naphthenate or cobalt octoate is preferably used as a promoter.

As a reaction catalyst (d) of the isocyanate functions with the alcohol functions of polyol polyester (a), it is possible to cite:

tertiary amines such as bis (dimethylaminoethyl) ether, trimethylamine, triethylamine, N-methylmorpholine, N-ethylmorpholine, N,N-dimethylbenzylamine, N,N-dimethylethanolamine, N,N,N',N'-tetramethyl-1,3-butanediamine, triethanolamine, 1,4-diazabicyclo [2,2,2] octane and pyridine oxide, tertiary phosphines such as trialkylphosphines and dialkylbenzylphosphines, strong bases such as hydroxides, alcoholates and phenolates of alkaline and alkaline-earth metals, metallic salts of strong acids such as ferric chlorides, stannic chlorides, stannous chlorides and bismuth chlorides, antimony trichloride and bismuth nitrate, chelates such as those that can be obtained from acetylacetone, benzoylacetone, trifluoroacetylacetone, ethyl acetoacetate, salicylaldehyde, cyclopentanone-2-carboxylate, acetylacetoimine, bis-acetylacetonealkylene diimines, salicylaldehyde imine and starting from metals such as beryllium, magnesium, zinc, cadmium, lead, titanium, zirconium, tin, arsenic, bismuth, chromium, molybdenum, manganese, iron, cobalt and nickel, alcoholates and phenolates of metals such as $Ti(OR)_4$, $Sn(OR)_4$, $Sn(OR)_2$ and $Al(OR)_3$ in which R is an alkyl or aryl group, salts of organic acids and metals such as alkaline metals and alkaline-earth metals, aluminum, tin, lead, manganese, cobalt, nickel and copper, for example, sodium acetate, potassium laurate, calcium hexanoate, stannous acetate, stannous octoate and stannous oleate, lead octoate, manganese and cobalt naphthenates, and carbonyl metals of iron and of cobalt and organometallic derivatives of tetravalent tin, of trivalent and pentavalent arsenic, of antimony and bismuth; among these derivatives more particular preference is given to dialkyltin salts of carboxylic acids such as dibutyltin diacetate, dibutyltin dilaurate, dibutyltin maleate, dilauryltin diacetate, dioctyltin diacetate, dibutyltin bis (4-methylaminobenzoate.), dibutyltin (6-methylaminocaproate), trialkyltin hydroxides, dialkyltin oxides, dialkyltin dialkoxides and dialkyl tin dichlorides.

Catalyst (d) is preferably used at a ratio of 0 to 1.5% by weight of the second component.

Preferably, the first component and the second component are brought together in proportions such that the molar ratio of the isocyanate functions to the hydroxyl functions of polyol polyester (a) and hydroxylated (alk)acrylate is about 0.7 to 1.1, and preferably between. 0.85 and 1.05. This rule corresponds most often to a ratio by weight of the second component to the first component of from about 1.5 to 3.0. An NCO/OH ratio that is higher, the higher the water content of polyol polyester (a) will be selected.

In the meaning of this invention, hydroxylated (alk) acrylate is defined as a compound of general formula:

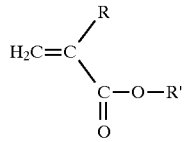

in which R is selected from among the hydrogen atom and the alkyl radicals that preferably have 1 to 4 carbon atoms, and R' is a radical that contains hydrocarbons, preferably an alkyl radical, carrying at least one hydroxyl function, preferably located at a chain end.

As examples of such compounds that can be used in this invention to form the reaction product that constitutes the polymer phase that can be hardened, it is possible to cite particularly hydroxyalkyl acrylates, hydroxyalkyl methacrylates and hydroxyalkyl ethylacrylates such as 2-hydroxyethyl and 2-hydroxypropyl acrylates and methacrylates, partial acrylic or methacrylic esters of di- or polyhydroxylated compounds such as the mono(meth) acrylate of ethylene glycol, of propylene glycol-1,2 or -1,3, of butylene glycol-1,4, of hexamethylene glycol-1,6, of diethylene glycol, of triethylene glycol, of dipropylene glycol, of glycerol, of trimethylolpropane, of pentaerythritol, etc.

Hydroxylated (alk)acrylate (e) is preferably present in the second component at a ratio such that $$\frac{(e)}{(a)+(e)}$$

is between about 5% and 20% by weight.

Generally, this ratio will be selected lower, the lower the functionality of polyisocyanate (A), i.e., closer to 2.

The resin that was just described makes it possible to produce an oriented-reinforcement material that is preimpregnated with resin and is suitable for shaping. The oriented reinforcement of the preimpregnated material that can be shaped can consist of any material that is already used conventionally in the technology of materials that are preimpregnated with synthetic resin, for example, mineral glass, carbon, or certain organic polymers such as polyamides. It can come in the form of fibers or wires with a length of at least about 25 mm, or of cloth or mat. When it consists of mineral glass, the oriented reinforcement preferably comes in the form of an assembly of a large number of minor filaments that are joined to form wires by an adhesive (often called a coupling agent), with these wires being grouped into bundles called "rovings." The ratio of oriented reinforcement in the preimpregnated material that can be shaped is most often 30% to 85% by weight and preferably about 50% to 80% by weight. The material according to the invention can be obtained by mixing the two components of the modified polyester-polyurethane resin at ratios such that the molar ratio of the NCO functions to the OH functions is about 0.7 to 1.1, whereby the mixing is carried out at a temperature of from about −5° C. to about 40° C. by pouring this mixture into a impregnation tank in which the oriented reinforcement is soaked long enough to allow it to be impregnated with the modified polyester-polyurethane resin. At the end of this time, the preimpregnated oriented-reinforcement material can be wound so that it can be stored in the form of coils. If necessary, the oriented reinforcement can, before it enters the impregnation bath, i.e., the impregnation tank that contains the resin, be coated with a protective film such as a paper film that contains silicone or plastic material on one of its faces and/or after it enters the impregnation bath, it can be coated with such a protective film on its other face. The soaking of the oriented reinforcement in the impregnation bath can be carried out either statically (discontinuous process) or, preferably, dynamically (continuous process) by making the oriented reinforcement advance at a rate of flow of about 10 m/min. to about 200 m/min. Thus, the average soaking time of the oriented reinforcement in the impregnation bath is preferably between about 1 and 30 seconds, when, as indicated above, the viscosity of the modified polyester-polyurethane resin does not exceed about 10 d Pa·sec at the impregnation temperature, which is selected to be from about 5° C. to about 40° C. Because of the duration of the "pot life," or stability before use, of the modified polyester-polyurethane resin, it is preferable that the soaking of the oriented reinforcement in said resin take place at most for 90 minutes, and preferably at most about 45 minutes after its two components are mixed. Beyond this period, actually, a change (increase) in the viscosity of the resin occurs, which makes it unsuitable for satisfactory wetting of the oriented reinforcement at the temperature in question.

After soaking in the bath and, if necessary, the application of a protective film of paper that contains silicone or plastic material on one of its faces, the preimpregnated material is generally too sticky and not rigid enough to be handled easily. To overcome this difficulty, it is necessary that at least about 80 mole % of the isocyanate functions that are present in first component (A) of the resin have been converted by reaction with the hydroxide functions that are present in the second component of the resin. For this purpose, it is sufficient to allow the preimpregnated material to be stored, before it is used in a molding process, for at least about 1 hour, and preferably for at least about 6 hours, at a temperature of about −5° C. to about 40° C., i.e., at a temperature which can be equal to the impregnation temperature. It is only in the case where the preimpregnated material needs to be handled that the conversion of the isocyanate functions can be accelerated by storing said material in an oven that is set to a temperature that is higher than room temperature, for example, on the order of 40° C. Storing the preimpregnated material for longer than this has no adverse effect on either its handling ability nor its mechanical properties. Thus, this preimpregnated material can be stored without any problems for a period of up to at least about 10 days before being used in a molding process.

The preimpregnated oriented-reinforcement material that can be shaped and that is described above can then be molded at a temperature of about 80° C. to 150° C. for a period of about 30 seconds to 6 minutes. The duration of the molding process is generally shorter, the higher the molding temperature. The technique used is most often the process of molding by resin transfer, using a pressure of about 5 to 100 bars. The mold used can be made of metal or synthetic resin, depending on the temperature and the pressure of the molding selected. A demolding agent of a type known in the art can be applied to the mold, if necessary. The preimpregnated oriented-reinforcement material can be either molded by itself or within the framework of the production of a composite product with different constituent materials as in the process according to the invention. Because of its excellent adhesion to the materials that are as varied as metals (steel, copper, aluminum) and plastics (polyethylene, polypropylene, polyamides, polyurethanes), it is particularly well suited for the latter framework.

The examples below are provided as illustrative and nonlimiting examples of this invention.

In the foregoing and in the following examples, all temperatures are set forth uncorrected in degrees Celsius; and, unless otherwise indicated, all parts and percentages are be weight.

The entire disclosure of all applications, patents and publications, cited above and below, and of corresponding French application No. 95/01485, filed February 7, 1995.

EXAMPLES

Example 1

A first resin component is first produced by mixing 98 parts by weight of poly-4,4'-diphenylmethane diisocyanate of a functionality equal to 2.2 that is marketed by the DOW CHEMICAL company under reference M309 and 2 parts by weight of tert-butyl peroxy-2-ethylhexanoate that is marketed by the AKZO company under reference TRIGONOX 21S.

In addition, a second resin component is prepared, comprising:
- 57 parts by weight of a polyol polyester of an acid index equal to 5 and an alcohol index equal to 270, prepared from 1 mol of fumaric acid, 0.51 mol of propylene glycol, 0.51 mol of neopentyl glycol, and 0.68 mol of diethylene glycol,
- 30.7 parts by weight of styrene, and
- 12.3 parts by weight of hydroxyethyl methacrylate.

A preimpregnated material that can be shaped is then produced by mixing the two resin components above at a temperature of 20° C., at ratios such that the molar ratio of the isocyanate functions that are present in the first component to the hydroxyl functions that are present in the second component is equal to 1.0 (i.e., with a ratio of weight R of the second component to the first component equal to 1.97), then by pouring this mixture in which a glass fiber cloth that is marketed by the FLEMINGS company under reference UD/UC-660, used at a ratio of 65 parts by weight of glass fiber to 35 parts by weight of resin, is soaked for 30 seconds at a temperature of 20° C. With the resin mixture, whose pot service life ("pot life") or stability before use is 75 minutes at 25° C., having a viscosity of 0.8 d Pa·sec at the selected temperature (20° C.), it is observed the impregnation of the glass cloth is carried out in a satisfactory manner. At the output of the bath, however, the preimpregnated material is not rigid enough and is too sticky to be handled easily. It is therefore necessary to store it for about 6 hours at 23° C. in order to be able to handle it. An analysis by infrared spectrometry shows that 80% of the isocyanate functions that are originally present have then been converted by reaction with the hydroxyl functions.

24 hours later, the preimpregnated oriented-reinforcement material thus obtained is molded in a metallic mold, in a press that is set to a temperature of 120° C., for 3 minutes and under a pressure of 100 bars. In the molded product thus obtained, the following properties are measured:
- TG: Vitreous transition temperature determined by differential scanning calorimetry and expressed in degrees Celsius,
- MT: modulus in tension according to standard NFT 51034 and expressed in MPa,
- CT: tensile stress according to standard NFT 51034 and expressed in MPa.

The results for the tensile properties that are measured at 23° C. appear in Table I. The tensile properties that are measured at −40° C. are as follows: MT=22,500 MPa, CT=438 MPa.

Example 2

The process steps of Example 1 are repeated, with the following exceptions:
- the second component consists of 64.6 parts by weight of the same polyol polyester, 21.5 parts by weight of styrene, and 13.9 parts by weight of hydroxyethyl methacrylate,
- ratio by weight R of the second component to the first component is equal to 1.93.

The resin obtained by mixing has a pot service life ("pot life") or stability before use at 25° C. of 55 minutes. It is used as in Example 1. The results for the properties measured in the molded product appear in Table I.

Examples 3 to 5

The process steps of Example 1 are repeated by causing the functionality of poly-4,4'-diphenylmethane diisocyanate and the ratio of hydroxyethyl methacrylate to vary in the resin while keeping constant (equal to 35%) the ratio by weight of styrene relative to the sum of the polyol polyester and the styrene. The adjustment of the functionality is carried out by replacing reference product M309 respectively with:
- the product of functionality 2.4 that is marketed by DOW CHEMICAL under reference M304 (Example 3),
- the product of functionality 2.1 that is marketed by the BAYER company under reference HV20 (Example 4),
- the product of functionality 2.0 that is marketed by DOW CHEMICAL under reference M342 (Example 5).

To take into account this change in the functionality, ratio by weight R of the second component to the first component of the resin is adjusted in the manner indicated in Table I. The results for the properties that are measured in the molded product as in Example 1 are listed in Table I.

Examples 6 to 8

The process steps of the preceding examples are repeated while setting the molar ratio of the isocyanate functions that are present in the first component to the hydroxyl functions that are present in the second component at 0.9 (instead of 1.0). To take this change into account, ratio by weight R of the second component to the first component of the resin is adjusted in the manner indicated in Table I. The poly-4,4'-diphenylmethane diisocyanates used are:
- for Example 6: reference HV20 of Example 4,
- for Example 7: reference M309 of Example 1,
- for example 8: reference M340 of functionality 2.1, marketed by DOW CHEMICAL.

The results for the properties that are measured in the molded product as in Example 1 are listed in Table I.

TABLE I

| Example | R | TG | MT | CT |
|---|---|---|---|---|
| 1 | 1.97 | 147 | 27,500 | 555 |
| 2 | 1.93 | 103 | 27,500 | 454 |
| 3 | 1.78 | 122 | 28,500 | 598 |
| 4 | 1.56 | 135 | 23,000 | 453 |

TABLE I-continued

| Example | R | TG | MT | CT |
|---------|------|------|--------|-----|
| 5 | 1.56 | n.d. | 24,500 | 494 |
| 6 | 1.81 | 135 | 24,800 | 390 |
| 7 | 2.20 | 109 | 28,500 | 530 |
| 8 | 1.85 | 104 | 26,700 | 608 | n.d.: not determined

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A process for production of a composite product, comprising:

juxtaposing at least one first material and an oriented-reinforcement material that is preimpregnated with resin, molding at a time and temperature effective to harden the resin and to connect the oriented reinforcements and to adhere the oriented reinforcement material to said at least one first material of the composite product, wherein said at least one first material and the resin are assembled simultaneously before the application of temperature in molding stage, such that the resin is not injected separately after the other materials in the mold are assembled, and wherein in said process said resin is a modified polyester-polyurethane that is formed by reacting:

a first component that comprises (A) at least one polyisocyanate that has a functionality of 2 to 3 and (B) a peroxide or a peroxide mixture that is able to initiate polymerization by free radicals, at a ratio such that:

$$\frac{(B)}{(A)+(B)}$$

is about 0.5 to 4% by weight, with a second component that comprises:

(a) at least one polyol polyester that is prepared from at least one diacid or ethylenically unsaturated anhydride and at least one polyhydric alcohol at an alcohol/acid molar ratio of about 1.3 to 2.0, (b) at least one ethylenically unsaturated monomer at a ratio such that $$\frac{(b)}{(a)+(b)}$$

is 10% to 50% by weight, and (c) at least one promoter of the decomposition of the catalyst peroxide in the first component at room temperature (20° C.), in an amount of about 0 to 4% by weight with respect to the level of the second component, (d) at least one catalyst of the isocyanate-alcohol reaction, in an amount of about 0 to 4% by weight with respect to the level of the second component, and (e) at least one hydroxylated (alk)acrylate at a ratio such that $$\frac{(e)}{(a)+(e)}$$

is between about 0.1% and 35% by weight, the ratio in moles of the NCO functions in the first component to the sum of the OH functions of components (a) and (e) of the second component being about 0.7 to 1.1.

2. A process according to claim 1, wherein molding is carried out at a temperature of 80° C. to 150° C.

3. A process according to claims 1, wherein molding is carried out for a period of 30 seconds to 6 minutes.

4. A process according to claim 1, where said at least one first material is a metal, a thermoplastic polymer or a polyurethane.

5. A process according to claim 1, wherein said at least one first material is steel, copper, aluminum, polyethylene, polypropylene or a polyamide.

6. A process according to claim 1, wherein the resin has a viscosity of not more than 10 d Pa·sec at a temperature at which the oriented-reinforcement material is impregnated with said resin.

7. A process according to claim 1, wherein the first component further comprises at least one additional ethylenically unsaturated monomer.

8. A process according to claim 1, wherein ethylenically unsaturated monomer (b) is styrene, vinyl toluene, tert-butyl styrene, α-methylstyrene, chlorostyrene, dichlorostyrene, dibutyl fumarate or maleate, diethyl fumarate or maleate, dimethyl fumarate or maleate, N-vinylpyrrolidone, allyl methacrylate, allyl acetate, diallyl succinate, N-vinylcarbazole, $C_{1-8}$-alkyl esters of acrylic acid or methacrylic acid, cyclohexyl or benzyl methacrylates or acrylates, isobornylf, or diallyl phthalate, diallyl maleate, diallyl fumarate, triallyl cyanurate or acetate, vinyl crotonate or propionate, divinyl ether, 1,3-butadiene, isoprene, 1,3-pentadiene, 1,4-pentadiene, 1,4-hexadiene, 1,5-hexadiene, 1-9-decadiene, 5-methylene-2-norbornene, 5-vinyl-2-norbomene, 2-alkyl-2,5-norbornadiene, 5-ethylidine-2-norbornene, 5-(2-propenyl)-2-norbornene, 5-(5-hexenyl)-2-norbornene, 1,5-cyclooctadiene, bicyclo octa-2,5-diene, cyclopentadiene, 4,7,8,9-tetrahydroindene, isopropylidene tetrahydroindene, acrylonitrile, methacrylonitrile, diacrylates or dimethacrylates of ethylene glycol, propylene glycol, 1,3-butanediol, 1,4-butanediol, 1,6-hexanediol, neopentyl glycol, 1,4-cyclohexanediol, 1,4-cyclohexanedimethanol, 2,2,4-trimethyl- 1 ,3-pentanediol, 2-ethyl-2-methyl- 1 ,3-propanediol, 2,2-diethyl- 1 ,3-propanediol, diethylene glycol, dipropylene glycol, triethylene glycol, tripropylene glycol, tetraethylene glycol, tetrapropylene glycol, trimethylolethane, trimethylolpropane, glycerol, or pentaerythritol; triacrylates or trimethacrylates of trimethylolethane, trimethylolpropane, glycerol or pentaerythritol; pentaerythritol tetraacrylates or tetramethacrylates, dipentaerythritol di(meth)acrylates, tri(meth)acrvlates, tetra(meth)acrvlates, penta(meth)acrvlates or hexa(meth)acrylates; triacrylate or trimethacrylate of triethoxylated trimethylolpropane or tripropoxylated trimethylolpropane; tripropoxylated glycerol triacrylate or trimethacrylate; tetraethoxylated pentaerythritol triacrylate, trimethacrylate, tetraacrylate or tetramethacrylate, or a mixture thereof.

9. A process according to claim 1, wherein the polyol polyester (a) is prepared from maleic, fumaric, citraconic, metaconic, itaconic or tetraconic acids, or a corresponding anhydride and ethylene glycol, propylene glycol, butylene glycol, diethylene glycol, dipropylene glycol, triethylene glycol, tetraethylene glycol, butanediol, pentanediol, hexanediol, dibromoneopentyl glycol, 2-methyl-1,3 propanediol, neopentyl glycol or bisphenol A.

10. A process according to claim 1, wherein the diacid used to prepare the polyol polyester (a) is a mixture of α,β-ethylene unsaturated dicarboxylic acids and up to about 45 mole % saturated polycarboxylic acids.

11. A process according to claim 1, wherein polyisocyanate (A) is 4,4'-diphenylmethane diisocyanate, 2,4- or 2,6-toluenediisocyanate, isophorone diisocyanate, tetramethylene diisocyanate, pentamethylene diisocyanate, 4,4'-dicyclohexylmethane diisocyanate, 2,2,4-trimethylhexamethylene-1,6-diisocyanate, triphenylmethane-4, 4,4''-triisocyanate, polymethylene (polyphenyl isocyanate), m-phenylene diisocyanate, p-phenylene diisocyanate, 1,5-naphthalene diisocyanate, naphthalene-1,4-diisocyanate, diphenylene-4,4'-diisocyanate, 3,3'-bi-tolylene-4,4'-diisocyanate, 1,4-cyclohexylene dimethylene diisocyanate, xylylene-1,4-diisocyanate, xylylene-1,3-diisocyanate, cyclohexyl-1,4-diisocyanate or 3,3'-dimethyldiphenylmethane-4,4'-diisocyanate.

12. A process according to claim 1, wherein the peroxide or peroxide mixture (B) is benzoyl peroxide, 2,5-dimethyl-2,5-bis (2-ethylhexolperoxy) hexane or methylethylcetone peroxide, a peroxydicarbonate, tert-butyl peroxybenzoate, tert-butyl peroxyoctoate, tert-amyl peroxyoctoate, 2,5-diperoxyoctoate, or 2,4-pentanedione peroxide.

13. A process according to claim 1, wherein the hydroxylated acrylate (e) has the formula

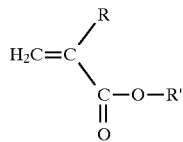

in which R is hydrogen or alkyl, and R' is a hydrocarbon radical having at least one hydroxyl group.

14. A composite product produced by a process according to claim 1.

15. A process for production of a composite product comprising molding at least one first material juxtaposed with an oriented reinforcement material preimpregnated with resin, which resin has been assembled with said first material prior to molding and not injected separately after materials to be molded are assembled, said molding being at a time and temperature effective to adhere to the oriented reinforcement material to said first material,
wherein in said process said resin is a modified polyester-polyurethane that is formed by reacting:
a first component that comprises (A) at least one polyisocyanate that has a functionality of 2 to 3 and (B) a peroxide or a peroxide mixture that is able to initiate polymerization by free radicals, at a ratio such that:

$$\frac{(B)}{(A)+(B)}$$

is about 0.5 to 4% by weight,
with a second component that comprises:
(a) at least one polyol polyester that is prepared from at least one diacid or ethylenically unsaturated anhydride and at least one polyhydric alcohol at an alcohol/acid molar ratio of about 1.3 to 2.0,
(b) at least one ethylenically unsaturated monomer at a ratio such that $$\frac{(b)}{(a)+(b)}$$

is 10% to 50% by weight, and
(c) at least one promoter of the decomposition of the catalyst peroxide in the first component at room temperature (20° C.), in an amount of about 0 to 4% by weight with respect to the level of the second component,
(d) at least one catalyst of the isocyanate-alcohol reaction, in an amount of about 0 to 4% by weight with respect to the level of the second component, and
(e) at least one hydroxylated (alk)acrylate at a ratio such that $$\frac{(e)}{(a)+(e)}$$

is between about 0.1% and 35% by weight,
the ratio in moles of the NCO functions in the first component to the sum of the OH functions of components (a) and (e) of the second component being about 0.7 to 1.1.

16. A process according to claim 15, where said at least one first material is a metal, a thermoplastic polymer or a polyurethane.

17. A process according to claim 15, wherein ethylenically unsaturated monomer (b) is styrene, vinyl toluene, tert-butyl styrene, a-methylstyrene, chlorostyrene, dichlorostyrene, dibutyl fumarate or maleate, diethyl fumarate or maleate, dimethyl fumarate and maleate, N-vinylpyrrolidone, allyl methacrylate, allyl acetate, diallyl succinate, N-vinylcarbazole, $C_{1-8}$-alkyl esters of acrylic acid or methacrylic acid, cyclohexyl, benzyl, methacrylates or acrylates, or isobornyl, diallyl phthalate, diallyl maleate, diallyl fumarate, triallyl cyanurate, acetate, vinyl crotonate or propionate, divinyl ether, 1,3- butadiene, isoprene, 1,3-pentadiene, 1,4-pentadiene, 1,4-hexadiene, 1,5-hexadiene, 1-9-decadiene, 5-methylene-2-norbornene, 5-vinyl-2-norbornene, 2-alkyl-2,5-norbornadienes, 5-ethylidine-2-norbornene, 5-(2-propenyl)-2-norbornene, 5-(5-hexenyl)-2-norbornene, 1,5-cyclooctadiene, bicyclo octa-2,5-diene, cyclopentadiene, 4,7,8,9-tetrahydroindene or isopropylidene tetrahydroindene, acrylonitrile or methacrylonitrile, diacrylates or dimethacrylates of ethylene glycol, propylene glycol, 1,3-butanediol, 1,4-butanediol, 1,6-hexanediol, neopentyl glycol, of 1,4-cyclohexanediol, of 1,4-cyclohexanedimethanol, 2,2,4-trimethyl-1,3-pentanediol, 2-ethyl-2-methyl-1,3-propanediol, 2,2-diethyl-1,3-propanediol, diethylene glycol, dipropylene glycol, triethylene glycol, tripropylene glycol, tetraethylene glycol, tetrapropylene glycol, trimethylolethane, trimethylolpropane, glycerol, pentaerythritol; triacrylates or trimethacrylates of trimethylolethane, trimethylolpropane, glycerol or of pentaerythritol; pentaerythritol tetraacrylates or tetramethacrylates, dipentaerythritol di(meth)acrylates up to hexa(meth)acrylates; triacrylate or trimethacrylate of triethoxylated trimethylolpropane or tripropoxylated trimethylolpropane; tripropoxylated glycerol triacrylate or trimethacrylate; tetraethoxylated pentaerythritol triacrylate, trimethacrylate, tetraacrylate or tetramethacrylate, or a mixture thereof.

18. A process according to claim 15, wherein polyisocyanate (A) is 4,4'-diphenylmethane diisocyanate, 2,4- or 2,6-toluenediisocyanate, isophorone diisocyanate, tetramethylene diisocyanate, pentamethylene diisocyanate, 4,4'-dicyclohexylmethane diisocyanate, 2,2,4-trimethylhexamethylene-1,6-diisocyanate, triphenylmethane-4,4''-triisocyanate, polymethylene (polyphenyl isocyanate), m-phenylene diisocyanate, p-phenylene diisocyanate, 1,5-naphthalene diisocyanate, naphthalene-1,4-diisocyanate, diphenylene-4,4'-diisocyanate, 3,3'-bi-tolylene-4,4'-diisocyanate, 1,4-cyclohexylene dimethylene diisocyanate, xylylene-1,4-diisocyanate, xylylene-1,3-diisocyanate, cyclohexyl-1,4-diisocyanate or 3,3'-dimethyldiphenylmethane-4,4'-diisocyanate.

19. A process according to claim 15, wherein the hydroxylated acrylate (e) has the formula

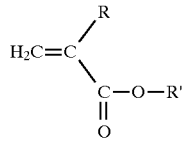

in which R is hydrogen or alkyl, and R' is a hydrocarbon radical having at least one hydroxyl group.

20. A composite product produced by a process according to claim 15.

* * * * *